Figure 1:
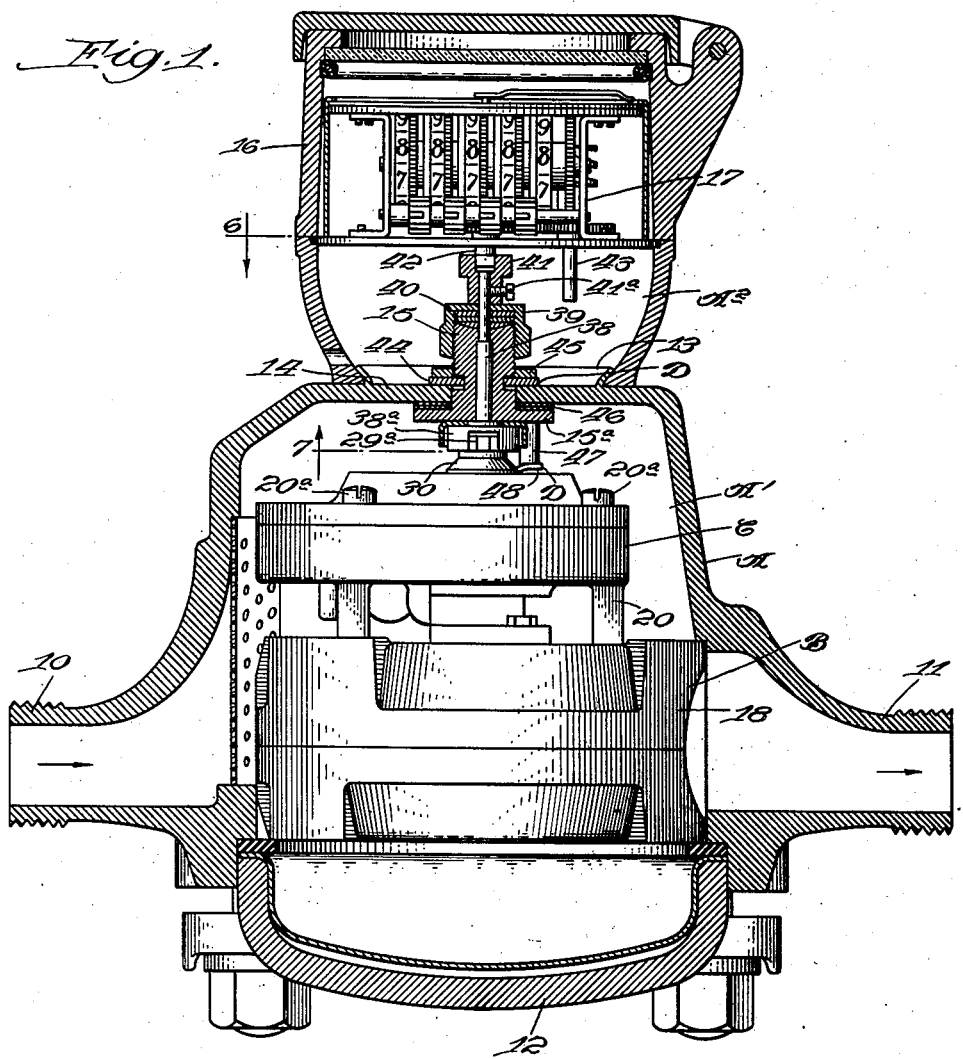

March 9, 1943.  R. C. BRADLEY  2,313,511
REGISTERING LIQUID METER
Filed May 27, 1939  3 Sheets-Sheet 1

Inventor:
Richard C. Bradley.
By Chritton, Wiles, Davies, Hirsch & Dawson.
Attys.

March 9, 1943.                R. C. BRADLEY                 2,313,511
                        REGISTERING LIQUID METER
                         Filed May 27, 1939        3 Sheets-Sheet 2
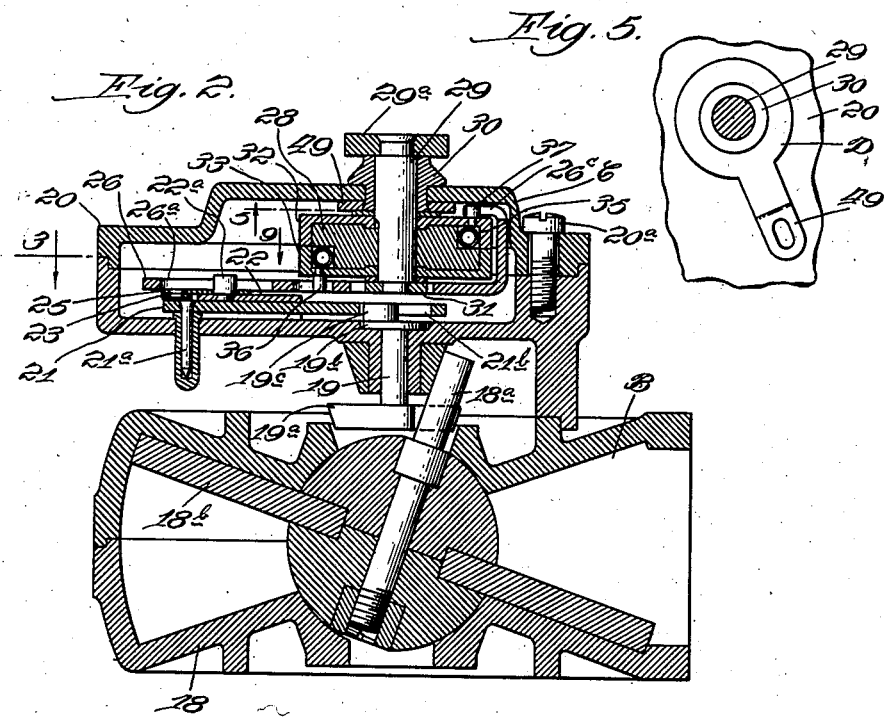
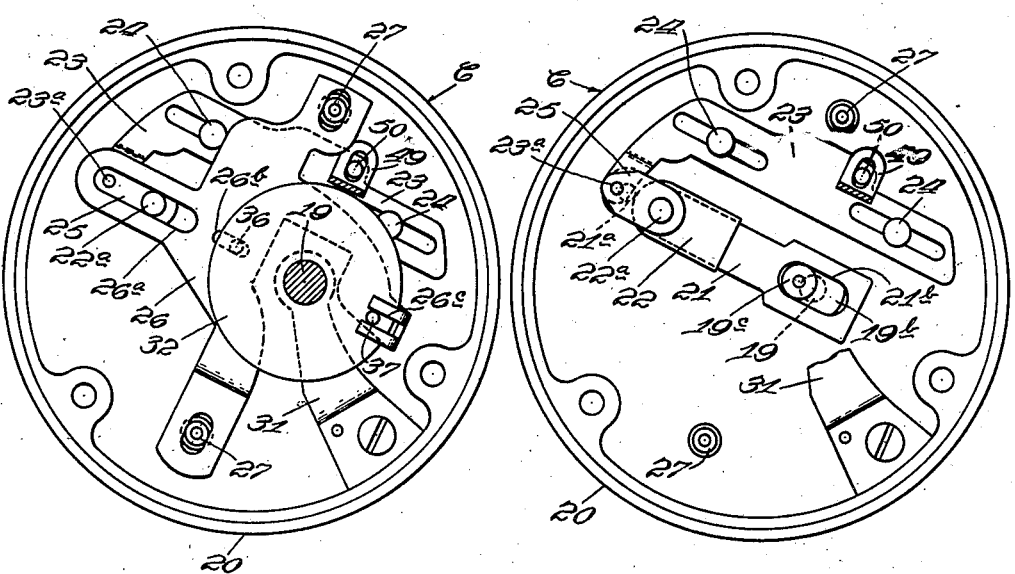
Inventor:
Richard C. Bradley.
By Chritton, Wiles, Davis, Hirschl & Dawson.
Attys.

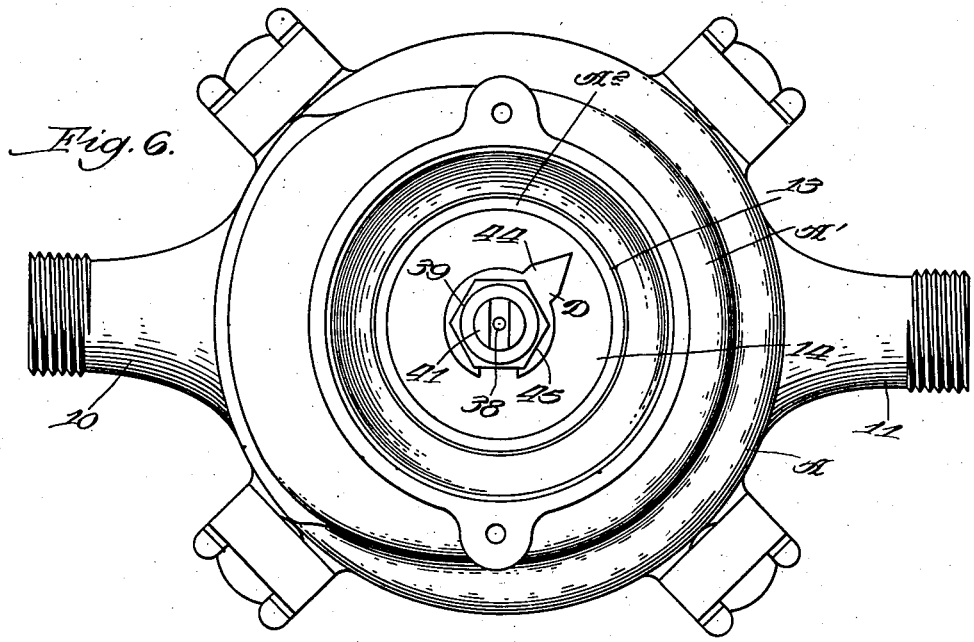
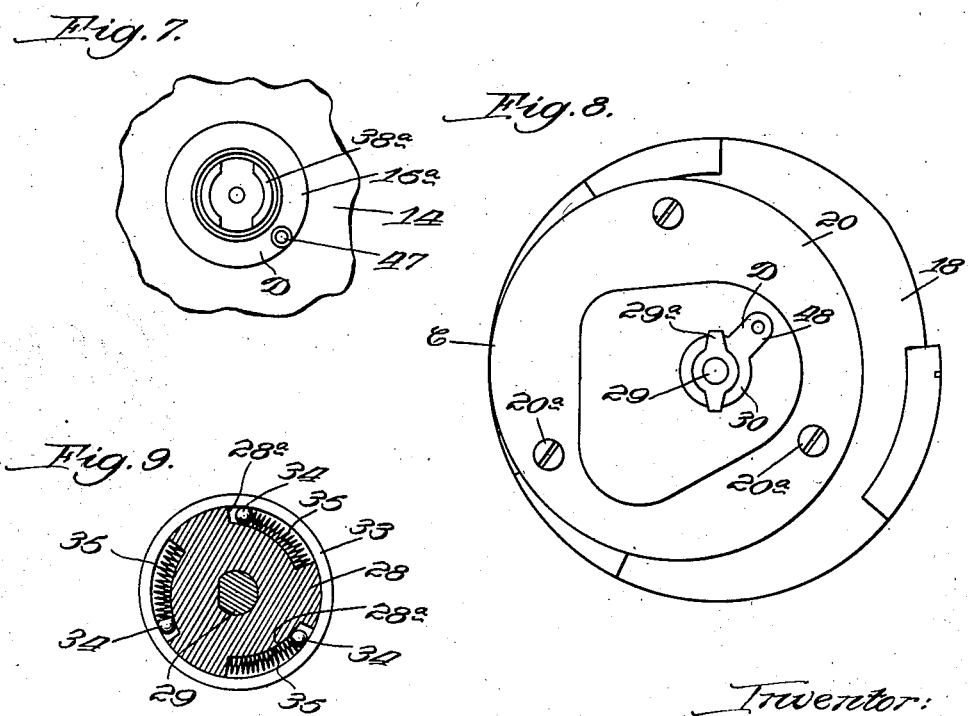

Patented Mar. 9, 1943

2,313,511

UNITED STATES PATENT OFFICE 2,313,511

REGISTERING LIQUID METER

Richard C. Bradley, Chicago, Ill.

Application May 27, 1939, Serial No. 276,166

6 Claims. (Cl. 73—233)

This invention relates to liquid meter devices having propellers, and more particularly to an improved adjustable transmission for driving registering mechanism from the propeller.

The primary object of the invention is to provide an improved liquid meter which may be easily adjusted to indicate the flow of liquids through the meter with a very high degree of accuracy.

A further object of the invention is to provide a simplified transmission which will accomplish a large speed reduction with a minimum number of parts.

A further object of the invention is to provide regulating means for varying the amount of speed reduction from the register chamber of a meter without making it necessary to open the liquid chamber.

The invention is particularly adapted for use in connection with water meters, oil meters, and the like, which are in wide use but heretofore have commonly produced an error of two per cent. The present invention provides a simple regulating device which makes it possible to reduce the error to one cubic inch per gallon. In the devices now in general use, a large train of gears is used to provide the necessary speed reduction and errors have to be corrected by substituting gears in the train of different ratios. Making adjustments in this manner is very laborious as it requires careful calibration and the tester is required to carry large numbers of gears of varying sizes. The number of teeth in a gear cannot be in fractions, and, accordingly, the accuracy of the device has definite limitations and rather large tolerances are necessary. The present invention has no such theoretical limitations and the meter may easily be regulated without the substitution of new parts.

The invention is illustrated in a preferred embodiment in the accompanying drawings, in which:

Figure 1 is a vertical sectional view of a liquid meter embodying the invention; Figure 2, a vertical sectional view of the propeller and transmission mechanism removed from the meter housing; Figure 3, a transverse sectional view, taken as indicated at line 3 of Figure 2; Figure 4, a broken view similar to Figure 3 with the clutch and slide member removed; Figure 5, a fragmentary sectional view, taken as indicated at line 5 of Figure 2; Figure 6, a plan view of the meter with the registering head removed, taken as indicated at line 6 of Figure 1; Figure 7, a fragmentary view, taken as indicated at line 7 of Figure 1; Figure 8, a plan view of the top of the transmission case; and Figure 9, a sectional view of the clutch, taken as indicated at line 9 of Figure 2.

In the embodiment illustrated, A designates a meter housing provided with a liquid chamber A', and a register chamber $A^2$; B, propeller mechanism which is operated by the flow of liquid from the inlet port to the outlet port of the meter; C, gearless variable-speed transmission; and D, control mechanism for regulating the speed transmission from the register chamber $A^2$.

In the embodiment illustrated, the meter casing A is of conventional construction having a large liquid chamber A' through which liquid is passed from the inlet port 10 to the outlet port 11. The liquid chamber is provided with a removable bottom 12 to permit access to the liquid chamber for cleaning and repair.

The register chamber $A^2$ is in the form of a head which is secured to the top of the liquid chamber by a flange 13 and is kept liquid sealed therefrom by means of a wall 14 through which a stuffing-box horn 15 extends. The upper portion 16 may easily be removed in the usual manner so that the counter mechanism 17 can be taken off and easy access is provided to the control mechanism D which is exposed in the bottom of the register chamber $A^2$.

The propelling mechanism B is of well-known construction, and, as will be readily understood, flow of liquid through the housing 18 will cause the stem 18a of the propeller 18b to rotate around the propeller shaft 19 and drive the shaft by engagement with an arm on the head 19a.

The gearless speed transmission C preferably has an oil-sealed case 20 which is held together by screws 20a and is mounted on the propeller housing 18. As will be clear from Figures 2 and 4, the propeller shaft 19 has a head 19b within the case 20 and is provided with an eccentric 19c. A rocker-member 21 is pivotally mounted in the casing on a pivot pin 21a. The other end of the rocker-member has a slot 21b which is engaged by the eccentric 19c so that rotation of the propeller shaft 19 will cause the rocker-member 21 to oscillate.

A sleeve 22 is slidably mounted on the rocker-member and carries a pivot 22a. The position of the pivot 22a on the rocker-arm is adjustably controlled by a slide 23 which is slidably secured to the case by means of cap screws 24. One end of the slide 23 has a pivot 23a which is connected to the pivot 22a by means of a pitman 25. Thus it will be understood that the slide 23 can move the pivot 22a on the rocker-member and thereby regulate the length of arc of travel of the pivot 22a.

As shown in Figures 2 and 3, a slide member 26 is superposed on the parts just described and is slidably mounted in the casing by pin-and-slot connections with the studs 27. The slide member 26 has an elongated slot 26a which is engaged by the pivot member 22a so that rotation of the propeller shaft 19 will result in reciprocation of the slide member.

The clutch-member has a head 28 mounted on a shaft 29 which passes through a stuffing-box 30 and is supported at its lower end by means of a bracket 31. As shown in Figures 2 and 9, the periphery and end portions of the clutch head are enclosed by cup-shaped driving members 32 and 33. Portions of the head are cut away to provide arcuate wedge-shaped slots 28a in which are mounted metal balls 34 which are urged into gripping position with the adjacent driving flange by means of compression springs 35. The lower driving member 33 is provided with a downwardly extending stud 36 which engages a slot 26b in the slide member 26. In like manner, an axially disposed stud 37 is provided on the driving member 32 and is engaged by the bifurcated end 26c which is turned up around the clutch head from the slide member 26.

The clutch head 28, accordingly, is driven step-by-step by the double acting ratchet and regardless of the direction of rotation of the propeller shaft 19, the clutch head rotates in but one direction. While conceivably a toothed ratchet could be used for less accurate work, it is preferred to use a friction ratchet of the type described because the lengths of stroke are not limited to tooth sizes. It may be noted that one drive advances the clutch head and grips it while the other drive is being returned for the next bite. In other words, the clutch head is gripped by at least three balls at all times and the advance is very positive and accurate.

The clutch shaft 29 is made up in two separable portions so that it is not necessary to disturb the upper portion 38 when it becomes necessary to remove parts from the bottom of the liquid chamber. The upper portion of the shaft 29 has a fixed head 29a which couples with the socket member 38a on the lower end of the shaft 38. The shaft 38 passes through the horn 15 and a liquid-tight joint is provided by a gland nut 39 which presses on compression washers 40. The upper end of the shaft is provided with a slotted head 41 secured to the shaft by means of a screw 41a and drives the worm wheel shaft 42 of the counter mechanism 17. The counter mechanism is shown with a depending finger screw 43 which is sometimes utilized in setting the dials on the counter mechanism.

As indicated above, one of the important features of the invention is to enable the speed transmission to be adjusted in the liquid chamber of the meter by mechanism in the register chamber. An indicating hand 44 is secured to the horn 15 and is normally clamped against the wall 14 by means of a lock nut 45. The lock nut draws the lower flange 15a against compression washers 46 and not only keeps the register chamber liquid-tight from the liquid chamber, but also grips the hand 44 in its set position. As shown in Figures 1 and 7, the flange 15a of the horn is provided with a depending pin 47 which interlocks with an arm 48 provided on the stuffing-box 30. Inside the casing 20, on the underside of the stuffing-box 30, is fixed a slotted arm 49 which engages a pin 50 on the slide 23. Thus it will be understood that by loosening the locking nut 45, the hand 44 may be turned to the right or left, causing the horn 15 and the lower stuffing-box 30 to turn and move the slide 23 to change the position of the pivot 22a on the rocker-arm and thereby regulate the length of the stroke of the ratchet drive members.

It will be understood that even if the meter be improperly connected, the counter will always run in the proper direction. If desired, a simple dial can be provided in the lower portion of the register chamber to indicate the correction that has been made by movement of the hand.

If desired, a simple tool may be provided in the form of a socket wrench having one end of a size to fit the nut 45 and the other end of a size that it may be inverted and used to turn the hand 44.

While the transmission might be left open as is sometimes done with gearing, it is preferred to enclose the mechanism in an oil-tight case so that it will be protected from liquids in the liquid chamber and may have proper lubrication.

The foregoing detailed description has been given for clearness of understanding only, and no unnecessary limitations should be understood therefrom, for some modifications will be obvious to those skilled in the art.

I claim:

1. In a liquid meter housing having a register chamber and a liquid chamber sealed from the register chamber and provided with a propeller, a gearless variable-speed transmission comprising: a frame in the liquid chamber having a rotary shaft driven by the propeller; said shaft having an eccentric; a clutch-member in said frame having a rotary shaft extending into the register chamber; oscillating operating-means driven by the said eccentric for rotating said clutch-member; and control-means in the register chamber extending into the liquid chamber and regulating said operating-means whereby the speed of one shaft may be adjusted with respect to the other.

2. In a liquid meter housing having a register chamber provided with rotary registering mechanism and a liquid chamber sealed from the register chamber and provided with a propeller, a gearless variable-speed transmission comprising: an oil-sealed case in the liquid chamber having a rotary shaft extending through said case so as to be driven by the propeller; said shaft having an eccentric; a unidirectional clutch-member in said case having a rotary shaft extending through the case into the register chamber to drive the registering mechanism; oscillating operating-means driven by said eccentric for turning said clutch-member step-by-step; and control-means in the register chamber extending into the liquid chamber and regulating said operating-means whereby the speed of one shaft may be adjusted relative to the other.

3. In a liquid meter housing having a register chamber and a liquid chamber sealed from the register chamber and provided with a propeller, a gearless variable-speed transmission comprising: a frame in the liquid chamber having a rotary shaft provided with an eccentric driven by the propeller; a clutch member in said frame having a rotary shaft extending into the register chamber; a ratchet on said clutch member; a rock member oscillated by said eccentric and provided with a pivot which drives said ratchet; and control means in the register chamber extending into the liquid chamber and regulating the position of said pivot on said rock member whereby the speed of one shaft may be adjusted with respect to the other.

4. In a liquid meter housing having a register chamber and a liquid chamber sealed from the register chamber and provided with a propeller, a gearless variable-speed transmission comprising: a frame in the liquid chamber having a rotary shaft provided with an eccentric driven by the propeller; a clutch member in said frame having a rotary shaft extending into the register chamber; a rock member oscillated by said eccentric and carrying a longitudinally adjustable pivot; a ratchet on the clutch member in driving relation with said adjustable pivot; and control means in the register chamber extending into the liquid chamber for moving the pivot to a desired position longitudinally of the rock member to regulate the oscillation of the ratchet and thereby control the speed of one shaft with respect to the other.

5. In a liquid meter housing having a register chamber provided with rotary registering mechanism and a liquid chamber sealed from said register chamber and provided with a propeller, a gearless variable-speed transmission comprising: an oil-sealed case in the liquid chamber having a rotary shaft extending through said case so as to be driven by the propeller; a stuffing-box horn between the register chamber and the liquid chamber; a unidirectional clutch-member in said case having a rotary shaft extending through said horn into the register chamber to drive the registering mechanism; operating-means driven by the propeller shaft for turning said clutch-member step-by-step; and control means on said horn for regulating said operating-means whereby the speed of one shaft may be adjusted relative to the other by twisting said horn.

6. In a liquid meter housing having a register chamber provided with rotary registering mechanism and a liquid chamber sealed from the register chamber and provided with a propeller, a gearless variable-speed transmission comprising: a stuffing-box horn between the register chamber and the liquid chamber; one portion of a clutch-shaft extending through said horn; an oil-sealed case in the liquid chamber having a rotary shaft extending through said case so as to be driven by the propeller; a stuffing-box on said oil-sealed case through which another portion of the clutch-shaft projects, the two portions of the clutch shaft being held in driving relation by means of a separable coupling; a uni-directional clutch-member on the second mentioned portion of the clutch-shaft in said case to drive the registering mechanism; oscillating operating-means driven by the rotary shaft for turning said clutch-member step-by-step; and control means in the register chamber for regulating said operating means in the oil-sealed case, including a separable driving connection between the stuffing-box horn and the stuffing-box on the case so that turning the stuffing-box horn will turn the stuffing-box on the case to control the speed of the clutch-shaft with respect to the rotary shaft.

RICHARD C. BRADLEY.